United States Patent [19]
Chen

[11] Patent Number: 5,469,939
[45] Date of Patent: Nov. 28, 1995

[54] ELASTIC SEAT OF BICYCLE BRAKE DEVICE

[76] Inventor: Tse-Min Chen, P.O. Box 1750, Taichung, Taiwan

[21] Appl. No.: 305,383

[22] Filed: Sep. 13, 1994

[51] Int. Cl.⁶ ................................................ B62L 3/00
[52] U.S. Cl. .................................. 188/24.21; 188/24.22
[58] Field of Search .............................. 188/24.11, 24.12, 188/24.15, 24.19, 24.21, 24.22

[56] References Cited

U.S. PATENT DOCUMENTS

| | | | |
|---|---|---|---|
| 5,058,450 | 11/1991 | Yoshigai | 188/24.21 X |
| 5,117,948 | 6/1992 | Yoshigai | 188/24.21 X |
| 5,373,918 | 12/1994 | Nagano | 188/24.21 |
| 5,390,767 | 2/1995 | Nagano et al. | 188/24.21 X |

*Primary Examiner*—Robert J. Oberleitner
*Assistant Examiner*—Lee W. Young

[57] ABSTRACT

An elastic seat of a bicycle brake device comprises a shaft sleeve, a bushing, a torsion spring, an adjustment cap, and a fastening bolt. The shaft sleeve is mounted in its entirety on a brake seat fastened at one end thereof with a fork of the bicycle. The shaft sleeve is provided with a retaining groove engageable with a retaining projection of the axial hole of the bushing. The bushing is further provided with a protruded ring engageable with a ring-shaped slot of the adjustment cap. The torsion spring is shielded by the bushing and the adjustment cap.

2 Claims, 4 Drawing Sheets

ELASTIC SEAT OF BICYCLE BRAKE DEVICE

FIELD OF THE INVENTION

The present invention related generally to a bicycle braking device, and more particularly to an elastic seat of the bicycle braking device.

BACKGROUND OF THE INVENTION

As shown in FIGS. 1 and 2, a conventional elastic seat of the bicycle brake device is composed of a shaft sleeve 10, a bushing 11, a torsion spring 12, and a fastening bolt 13. The shaft sleeve 10 is rotatably fastened to a brake seat 141 which is in turn fastened to a fork 14. The shaft sleeve 10 is received in a hole of a brake arm 15 as well as an axial hole 111 of the bushing 11 having a locating hole 112. The torsion spring 12 has one end which is received in the locating hole 112 of the bushing 11. The torsion spring 12 further has another end which is received in a locating hole 142 of the fork 14. The elastic seat is then fastened by means of the fastening bolt 13.

The prior art elastic seat of the bicycle brake device described above has inherent shortcomings, which are expounded explicitly hereinafter.

The prior art elastic seat of the bicycle brake device is made up of component parts which can not be assembled easily.

The torsion spring 12 of the prior art elastic seat of the bicycle brake device is rather vulnerable to a mechanical fatigue in view of the fact that the torsion spring 12 is not protected by a shield.

The prior art elastic seat of the bicycle brake device is not fastened securely with the brake seat 141 in view of the fact that the shaft sleeve 10 is not fully mounted on the brake seat 141, and that the brake seat 141 is susceptible to breakage caused by the action force exerting on the brake seat 141.

SUMMARY OF THE INVENTION

It is therefore the primary objective of the present invention to provide an elastic seat of the bicycle brake device, which is made up of component parts capable of being fastened securely together.

It is another objective of the present invention to provide an elastic seat of the bicycle brake device with a torsion spring which is well shielded so as to prolong the service life span of the torsion spring.

It is still another objective of the present invention to provide an elastic seat of the bicycle brake device, which is fully fastened to the brake seat so as to ensure that the brake seat is not vulnerable to breakage.

The foregoing objectives of the present invention are attained by an elastic seat of the bicycle brake device, which comprises a shaft sleeve, a bushing, a torsion spring, an adjustment cap, and a fastening bolt. The shaft sleeve is provided with a retaining groove engageable with a retaining projection of the axial hole of the bushing. The bushing is further provided with a protruded ring which is engageable with a ring-shaped slot of the adjustment cap. The torsion spring is protected by the bushing and the adjustment cap. The shaft sleeve is mounted entirely on the brake seat.

The foregoing objectives, structures, features, functions and advantages of the present invention will be more fully understood upon a thoughtful deliberation of the following detailed description of the present invention in conjunction with the accompanying drawings.

DETAILED DESCRIPTION OF THE INVENTION

Figure 1:
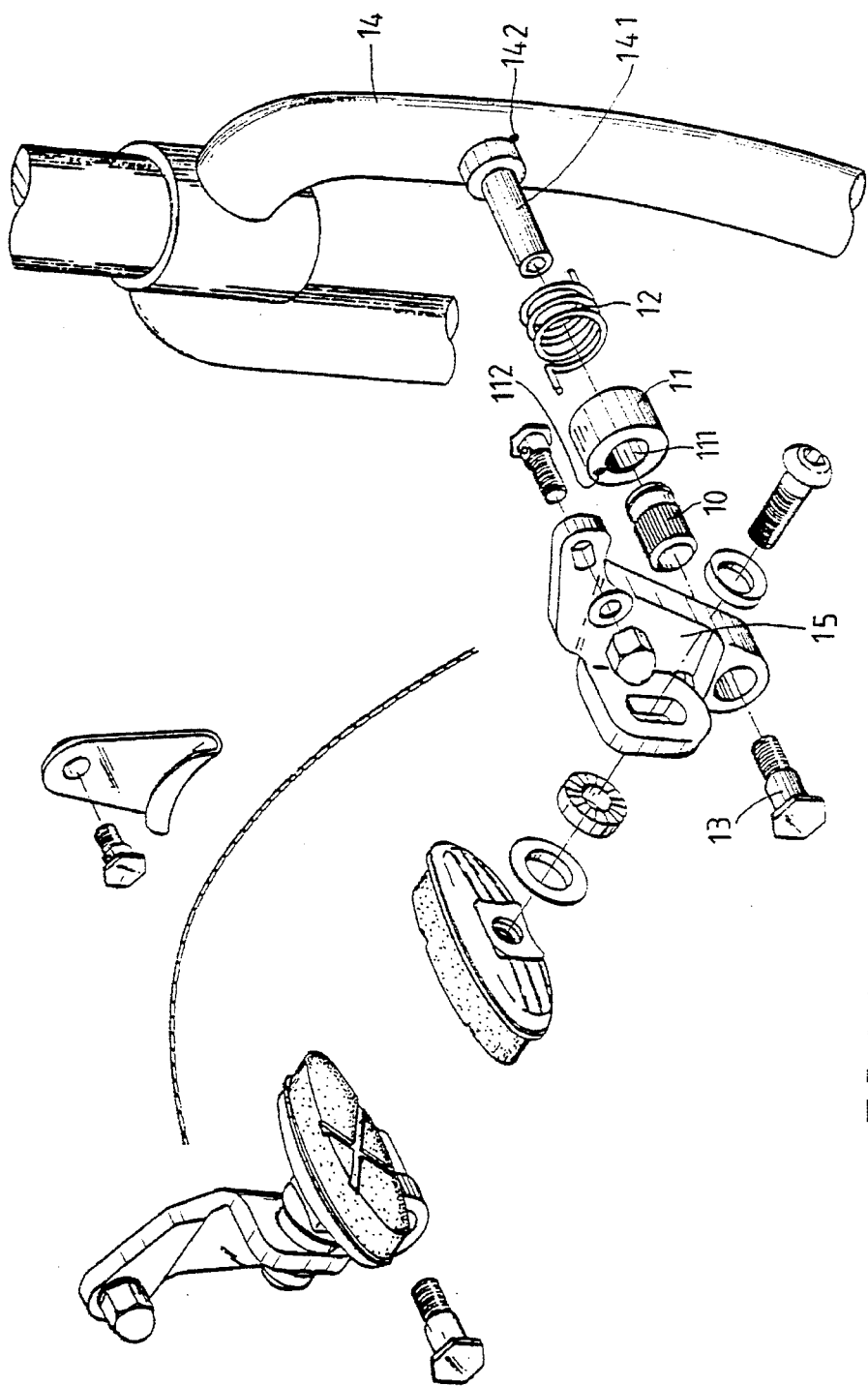
FIG. 1 shows an exploded view of an elastic seat of the bicycle brake device according to the prior art.
Figure 2:
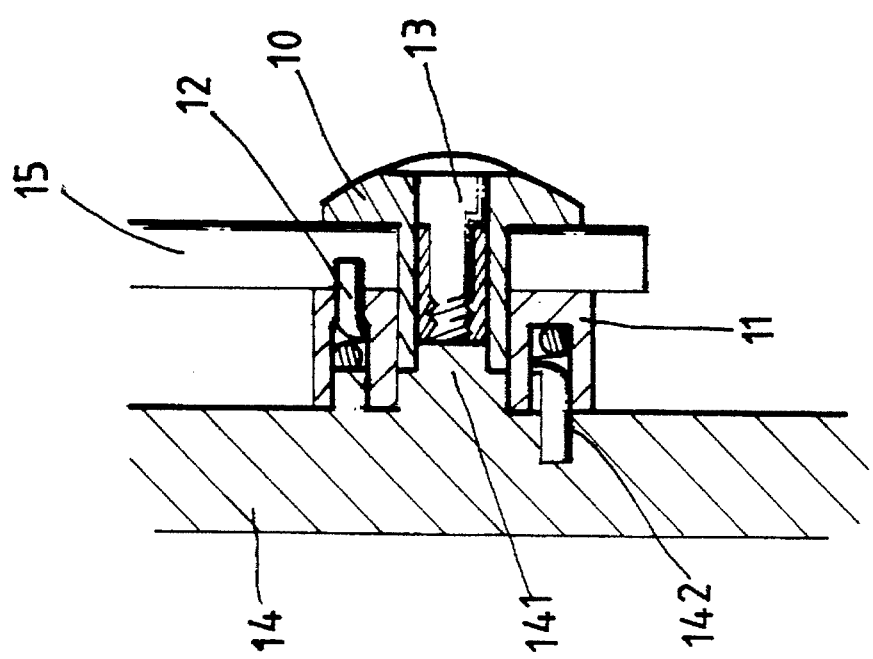
FIG. 2 shows a sectional schematic view of the elastic seat of the bicycle brake device as show in FIG. 1.
Figure 3:
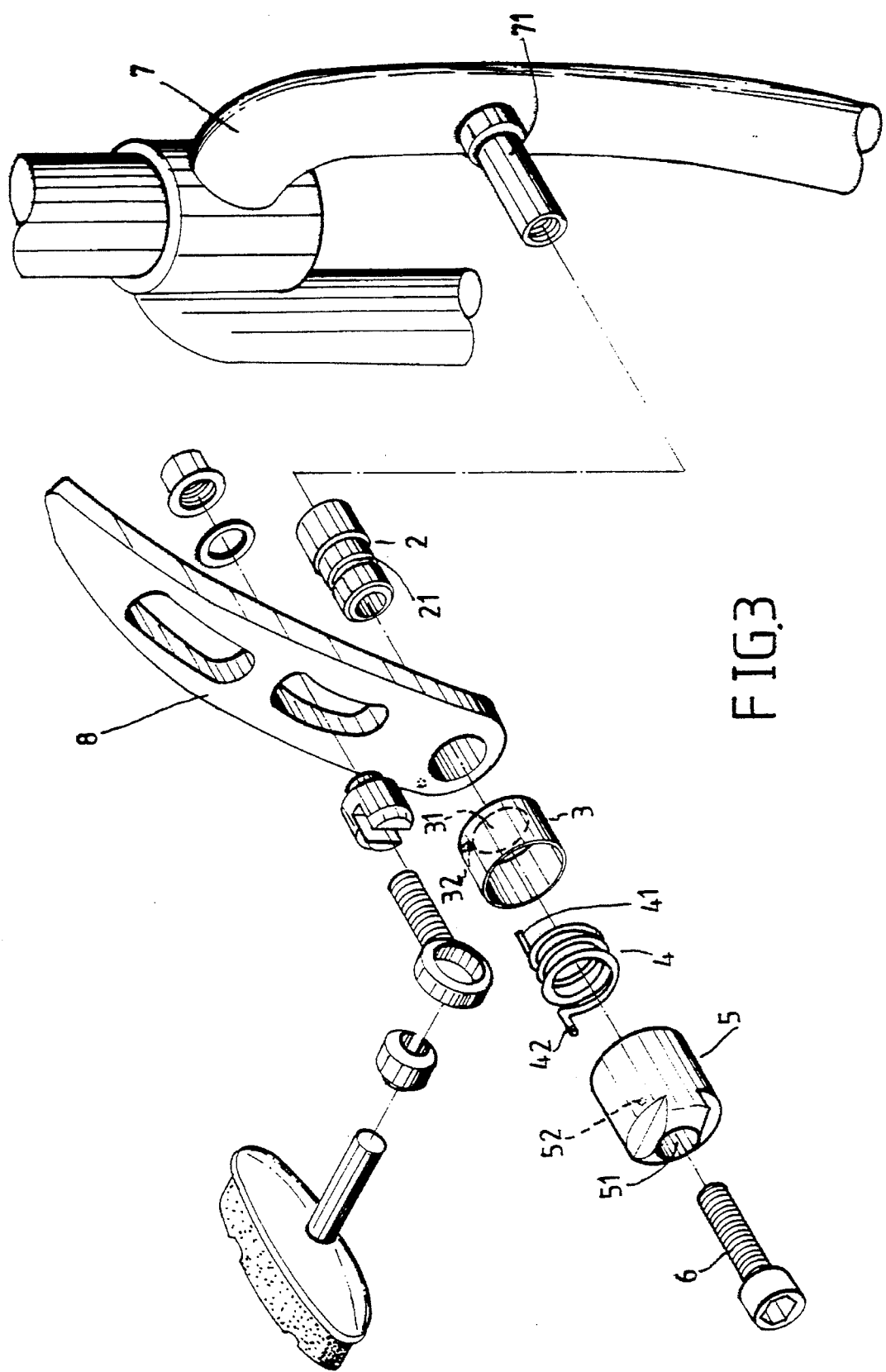
FIG. 3 shows an exploded view of an elastic seat of the bicycle brake according to the present invention.
Figure 4:
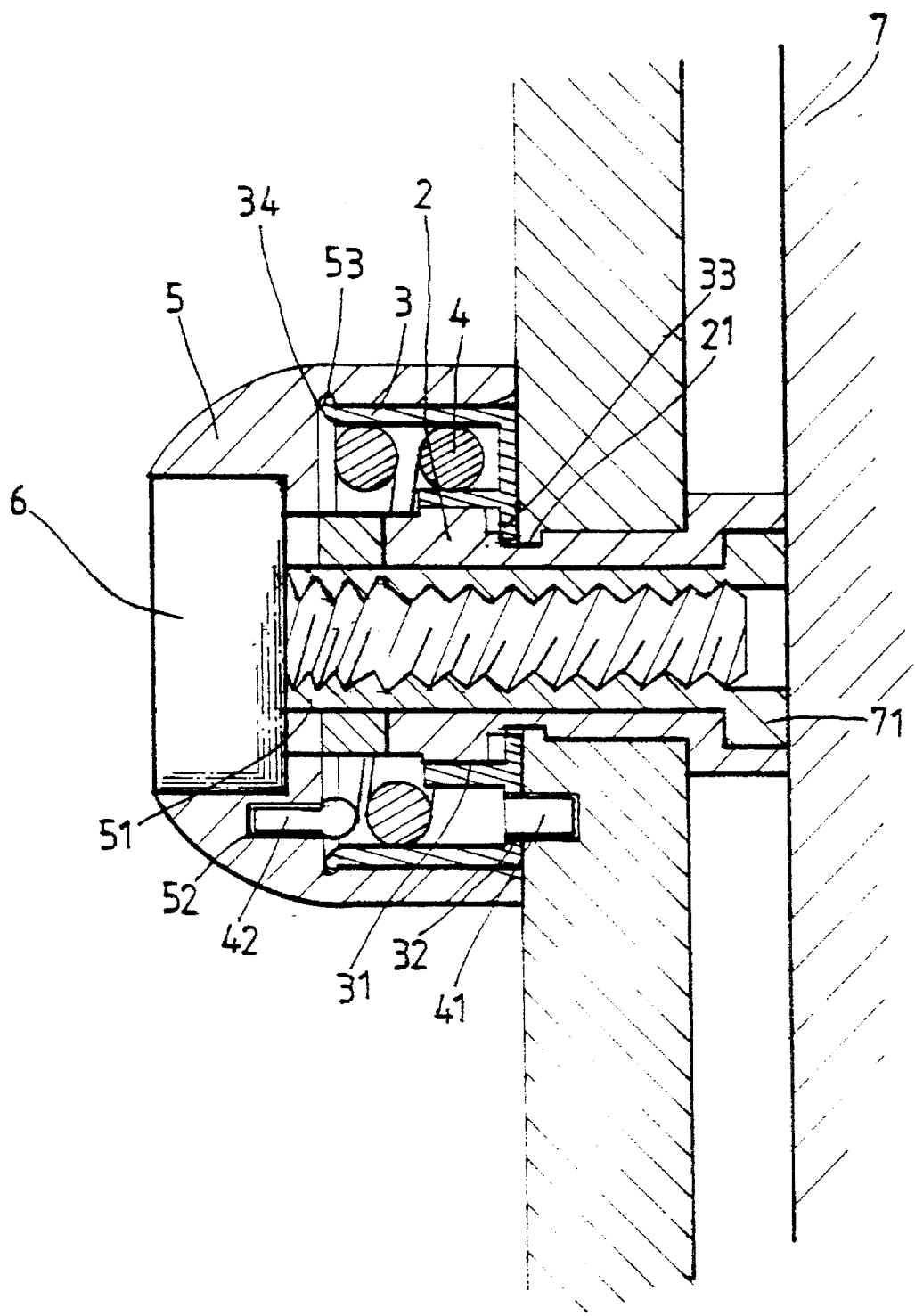
FIG. 4 shows a sectional schematic view of the elastic seat of the bicycle brake device as shown in FIG. 3.

As shown in FIGS. 3 and 4, an elastic seat of the bicycle brake device of the present invention comprises a shaft sleeve 2, a bushing 3, a torsion spring 4, an adjustment cap 5, and a fastening bolt 6.

The shaft sleeve 2 is mounted on a brake seat 71 which is fastened at one end thereof with a fork 7. The shaft sleeve 2 is fixed by a brake arm 8 and is provided with a circular groove 21. As shown in FIG. 4, the shaft sleeve 2 is mounted in its entirety on the brake seat 71 so as to enhance the capability of the brake seat 71 to sustain the pulling force.

The bushing 3 has an axial hole 31 dimensioned to receive therein the shaft sleeve 2. The bushing 3 further has a locating hole 32. Located at one end of the axial hole 31 is a retaining projection 33 engageable with the circular groove 21 of the shaft sleeve 2. Located at another end of the axial hole 31 is a protruded ring 34.

The torsion spring 4 is disposed in the bushing 3 such that the torsion spring 4 is fitted over the shaft sleeve 2, and that one end 41 of the torsion spring 4 is located in the locating hole 32 of the bushing 3.

The adjustment cap 5 is fitted over the bushing 3 and provided with an axial hole 51 and a locating hole 52 in which another end 42 of the torsion spring 4 is located. The adjustment cap 5 is further provided with a ring-shaped slot 53 corresponding in location to and engageable with the protruded ring 34 of the bushing 3. As a result, the bushing 3 and the adjustment cap 5 are so securely fastened together as to shield the torsion spring 4. The service life span of the torsion spring 4 is therefore prolonged.

The fastening bolt 6 is engageable with the threaded hole of the brake seat 71 and is intended for use in fastening together the adjustment cap 5, the torsion spring 4, the bushing 3 and the shaft sleeve 2.

The one end 41 of the torsion spring 4 can be actuated by a motion of the brake arm 8 while another end 42 of the torsion spring 4 is fixed. Upon completion of the braking action, the brake arm 8 can be forced by the elastic force of the torsion spring 4 to return to its original position.

The elastic seat of the bicycle brake device is made up of the shaft sleeve 2, the bushing 3, the torsion spring 4 and the adjustment cap 5, which are fastened together securely on the brake seat 71 by the fastening bolt 6. The work of assembling the component parts of the elastic seat of the present invention can be done with ease and speed.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. An elastic seat of a bicycle brake device comprising:

a shaft sleeve rotatably mounted on a brake seat fastened at one end thereof with a fork of a bicycle, said shaft sleeve further fastened with a brake arm;

a bushing provided with a locating hole and an axial hole dimensioned to receive therein said shaft sleeve;

a torsion spring disposed in said bushing such that said torsion spring is fitted over said shaft sleeve, and that one end of said torsion spring is located in said locating hole of said bushing;

an adjustment cap fitted over said bushing and provided with an axial hole and a locating hole in which another end of said torsion spring is located; and a fastening means engageable with a threaded hole of said brake seat for fastening together said adjustment cap, torsion spring, said bushing and said shaft sleeve on said brake seat;

wherein said shaft sleeve is provided with a retaining slot; wherein said axial hole of said bushing has one end which is provided with a retaining projection engageable with said retaining slot of said shaft sleeve for holding said bushing and said shaft sleeve together securely; wherein said axial hole of said bushing has another end which is provided with a protruded ring; and wherein said adjustment cap is provided therein with a retaining recess corresponding in location to and engageable with said protruded ring of said axial hole of said bushings for holding said bushing and said adjustment cap together securely.

2. The elastic seat of a bicycle brake device according to claim 1 wherein said shaft sleeve is mounted in its entirety on said brake seat.

* * * * *